(12) United States Patent
Iwakura et al.

(10) Patent No.: US 9,230,566 B1
(45) Date of Patent: Jan. 5, 2016

(54) PERPENDICULAR MAGNETIC WRITE HEAD HAVING A CONTROLLED MAGNETIZATION STATE SHIELD

(71) Applicant: HGST Netherlands B.V., Amsterdam (NL)

(72) Inventors: Tadayuki Iwakura, Kanagawa (JP);
Yohji Maruyama, Saitama (JP);
Wataru Kimura, Kanagawa (JP);
Shigeru Tadokoro, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/526,627

(22) Filed: Oct. 29, 2014

(51) Int. Cl.
*G11B 5/11* (2006.01)
*G11B 5/127* (2006.01)

(52) U.S. Cl.
CPC ............... *G11B 5/11* (2013.01); *G11B 5/1278* (2013.01)

(58) Field of Classification Search
CPC .... G11B 5/1278; G11B 5/3116; G11B 5/315; G11B 5/3163; G11B 5/3146
USPC ........................................................ 360/125.3
See application file for complete search history.

(56) References Cited

U.S. PATENT DOCUMENTS

| | | | |
|---|---|---|---|
| 8,201,320 B2 * | 6/2012 | Allen et al. ................. | 29/603.16 |
| 8,254,059 B2 * | 8/2012 | Horide et al. ............ | 360/125.03 |
| 8,355,222 B2 * | 1/2013 | Mino et al. ................. | 360/125.3 |
| 8,385,020 B2 * | 2/2013 | Min .......................... | 360/125.3 |
| 8,411,384 B2 | 4/2013 | Mochizuki et al. | |
| 8,451,563 B1 * | 5/2013 | Zhang et al. ............... | 360/125.3 |
| 8,842,389 B2 * | 9/2014 | Bai et al. .................... | 360/125.3 |
| 2009/0262464 A1 * | 10/2009 | Gill et al. ...................... | 360/319 |
| 2010/0110585 A1 | 5/2010 | Takano et al. | |
| 2011/0007428 A1 | 1/2011 | Batra et al. | |
| 2011/0097601 A1 | 4/2011 | Bai et al. | |
| 2011/0116195 A1 | 5/2011 | Cazacu et al. | |
| 2012/0026628 A1 | 2/2012 | Li et al. | |
| 2012/0106002 A1 * | 5/2012 | Hsu et al. .................. | 360/125.33 |
| 2012/0140356 A1 | 6/2012 | Horide | |

* cited by examiner

*Primary Examiner* — Mark Blouin
(74) *Attorney, Agent, or Firm* — Patterson & Sheridan, LLP

(57) ABSTRACT

Embodiments disclosed herein generally relate to a perpendicular magnetic recording head for recording magnetic information and a magnetic recording device employing the magnetic head. The magnetic recording head comprises at least one thin shield region having a high coercive force and a magnetization direction oriented towards the right when viewed from the MFS with the leading side on bottom and the trailing side on top, and at least one thick shield region having a low coercive force. The thin shield region surrounds a main pole, and the thick shield region partially surrounds the thin shield region. The magnetic recording head is able to reduce FTI by controlling the magnetization direction of the shield layers.

20 Claims, 10 Drawing Sheets

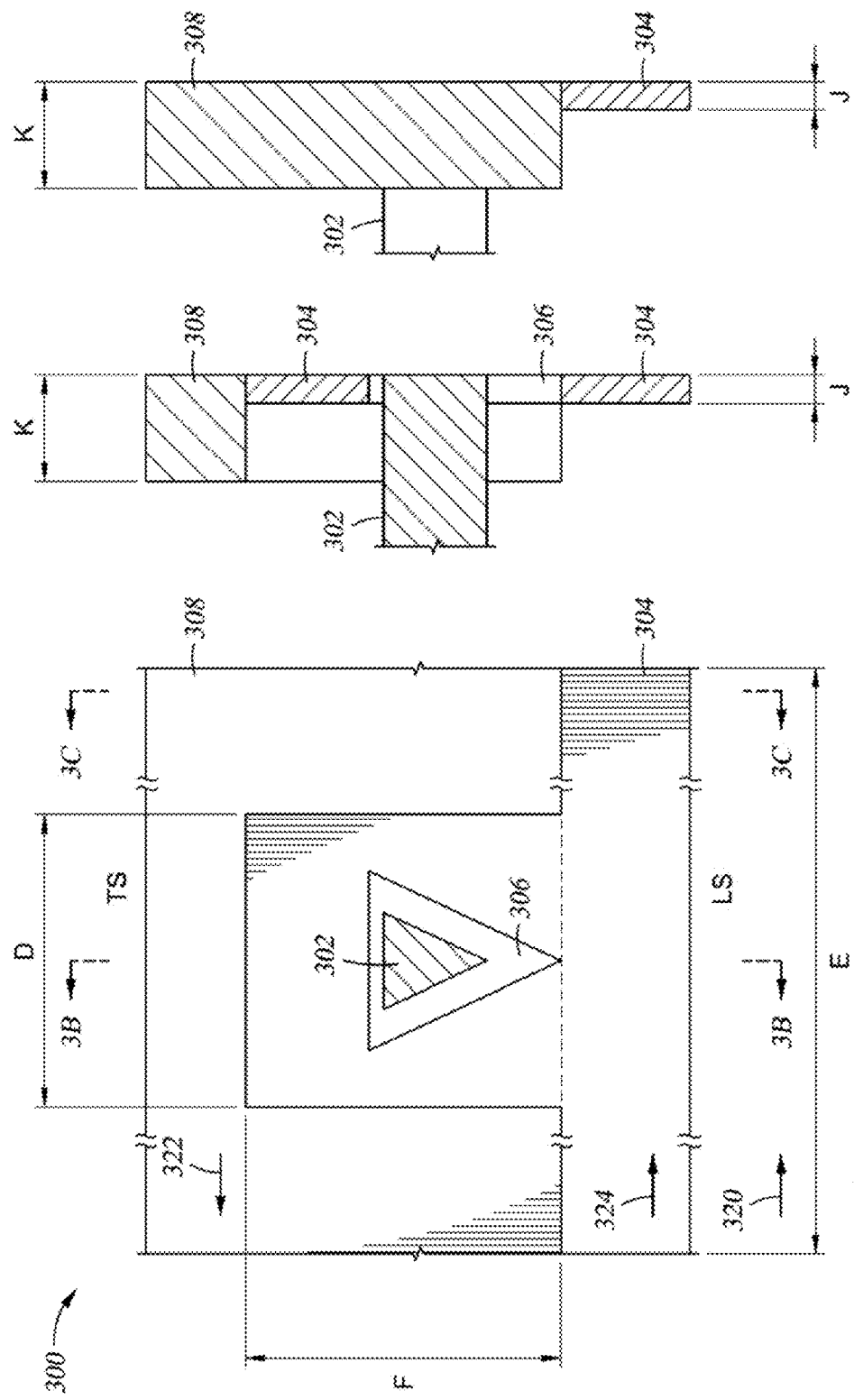

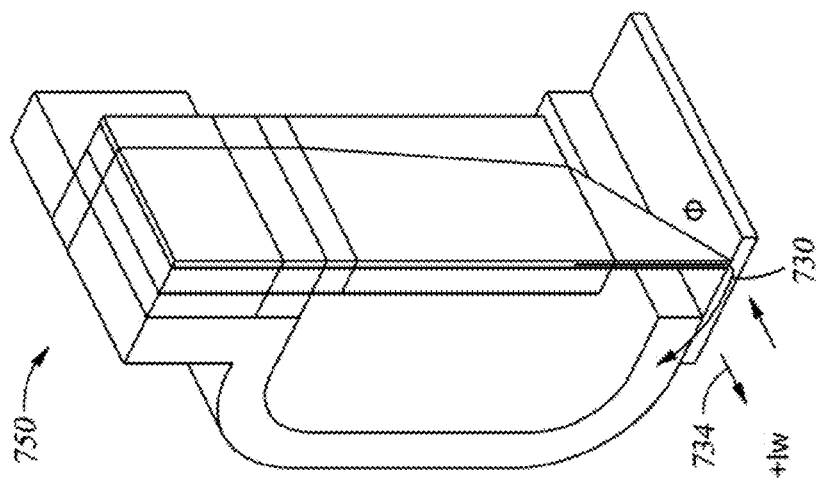
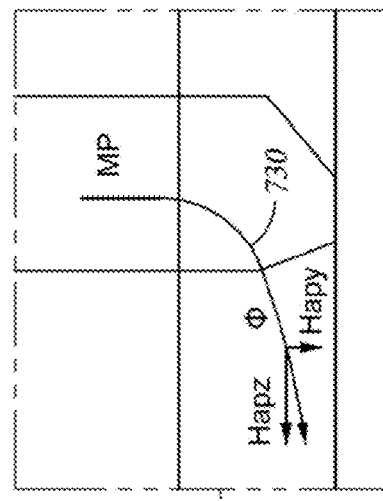
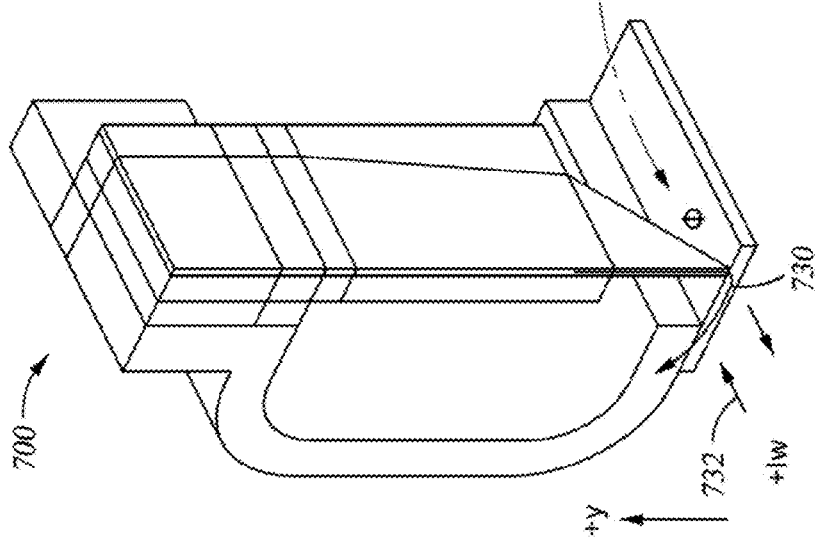
Fig. 7A
Fig. 7B

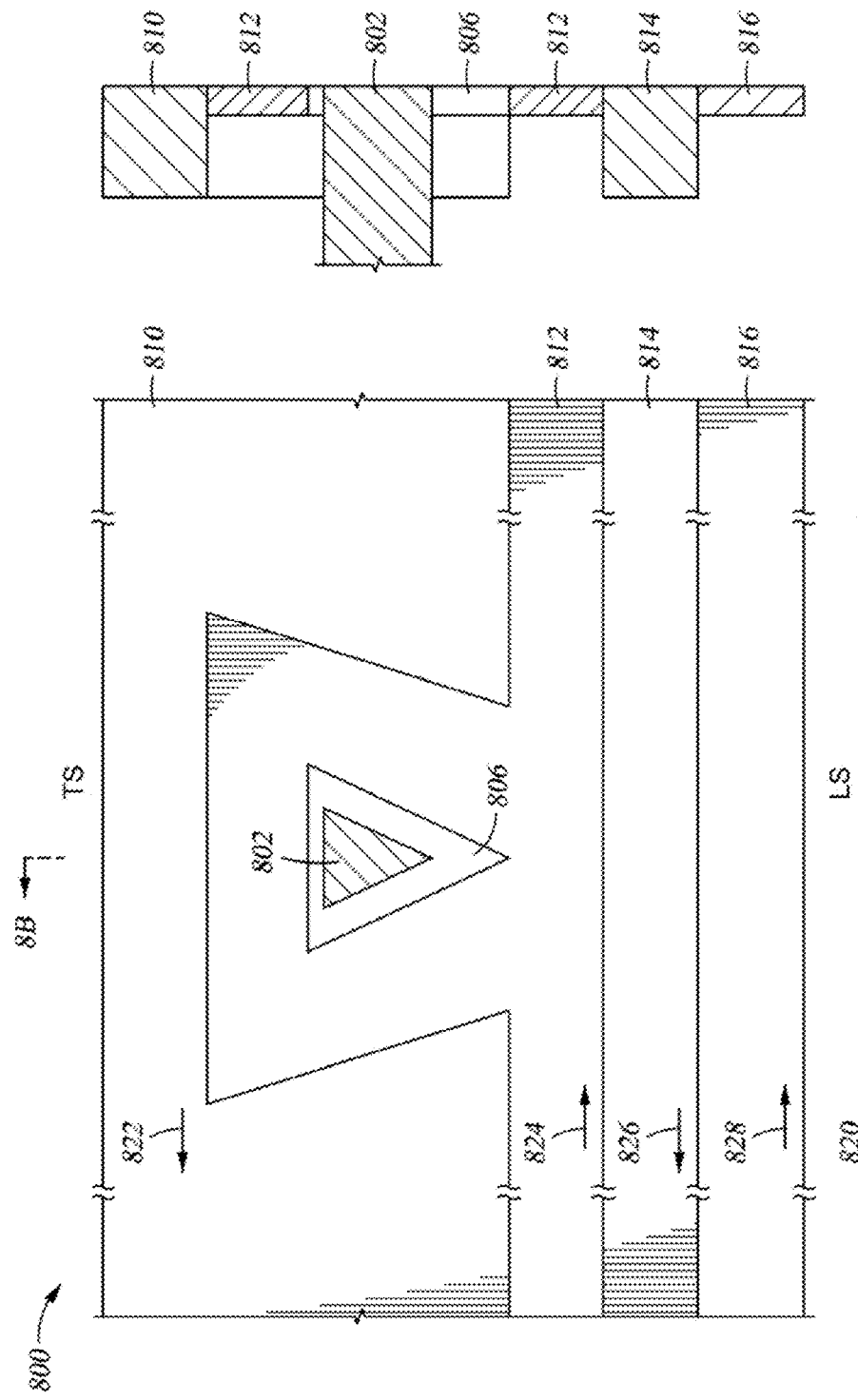

PERPENDICULAR MAGNETIC WRITE HEAD HAVING A CONTROLLED MAGNETIZATION STATE SHIELD

BACKGROUND

1. Field

Embodiments disclosed herein generally relate to a perpendicular magnetic recording head for recording magnetic information and a magnetic recording device employing the magnetic head.

2. Description of the Related Art

The amount of data handled by society has dramatically increased with the recent development of a highly information-based culture. Information storage devices that can input and output large volumes of data at high-speed are therefore needed, and one such device capable of this is a magnetic recording/reproduction device typified by a hard disk device. The recording density of hard disk devices continues to increase steadily due to the adoption of perpendicular recording technology and improvements therein, and attempts are currently being made to reach a density of 650 Gb/in$^2$. However, the problem of heat fluctuation of the magnetic recording medium is gradually becoming apparent with increasing recording densities. An effective way of dealing with heat fluctuation involves increasing the anisotropy energy of the magnetic recording medium. In the case of a magnetic recording head having a small width adapted for a high recording density, an adequate recording magnetic field cannot be produced and recording is no longer possible. As a way of overcoming this problem, the distance between the magnetic recording head and recording medium is reduced, and a three-dimensional taper is provided on the main pole forming part of the magnetic recording head in order to generate a strong magnetic field.

The way of intensifying the recording magnetic field has given rise to a problem such that a leakage magnetic field is produced outside the recording track region. The main pole applies a strong magnetic field to the required recording track width, and a constricted structure known as a flare is provided. The flare part of the main pole is magnetically saturated during the recording operation so that when the distance from the recording medium is narrowed, a phenomenon occurs whereby the magnetic flux leaks directly from the flare part of the main pole to the recording medium.

FIGS. 1A-1B show a conventional magnetic head structure. FIG. 1A shows a side view of the conventional magnetic recording head 100 while FIG. 1B shows the conventional magnetic recording head 100 when viewed from the media facing surface (MFS). The conventional magnetic recording head 100 comprises: a main pole 115, a magnetic structure 116 which is magnetically coupled to the main pole 115 and increases the magnetic flux generation efficiency, a magnetic structure 113 constituting an auxiliary pole, and a coil 117. In particular, magnetic structures 112, 114 and 121 are disposed in the vertical and lateral directions of the main pole 115 and the area around the main pole is enclosed by the MFS. Here, the magnetic structures 112, 114 and 121 are referred to as shields, and in particular, 114 is referred to as the leading shield (LS), 121 is referred to as the side shield (SS) and 112 is referred to as the trailing shield (TS).

The abovementioned technology makes it possible to reduce the leakage magnetic field from the main pole to the medium, and as a result it is possible to solve the problem of incorrect magnetic data being recorded to an adjacent track. However, a problem may arise in that the quality of magnetic data written previously deteriorates in regions remote from the recording track. Deterioration of the quality of the magnetic data depends on the number of times data has been rewritten to the same track continuously, and it may no longer be possible to read out all the information after about 3,000 times. This phenomenon is known as far track interference (FTI).

FIG. 2 is a graph 200 showing an example of FTI in a magnetic recording head having flux leakage. The horizontal axis shows the position in the off-track direction (μm), with ID representing the inner diameter of a recording medium and OD representing the outer diameter of the recording medium, while the vertical axis shows the amount of reduction in the error rate (order of magnitude). For the measurements, the reproduction head was scanned after magnetic data had been written to the same track 10,000 times, and variations in the error rate in the old data were measured. The measurements were carried out using a plurality of heads (30 heads: n=30 hds). The graph 200 shows that positional offsets of 1-2 μm in both the ID and OD directions and deterioration in error rate of one order of magnitude or more were observed for essentially all of the heads. The phenomenon is a considerable obstacle to maintaining non-volatility in a magnetic recording device.

It is known to those skilled in the art that a flared head is effective for reducing the leakage magnetic field in the region of the main pole and is also effective against FTI to some extent. However, when a magnetic recording head is produced using flared head technology, the effect against FTI does not function constantly for all heads, and non-conforming articles accounting for up to about 50% are produced.

There is a need in the art for a magnetic recording device exhibiting a stable effect of restricting FTI.

SUMMARY

Embodiments disclosed herein generally relate to a perpendicular magnetic recording head for recording magnetic information and a magnetic recording device employing the magnetic head. The magnetic recording head comprises at least one thin shield region having a high coercive force and a magnetization direction oriented towards the right when viewed from the MFS with the leading side on bottom and the trailing side on top, and at least one thick shield region having a low coercive force. The thin shield region surrounds a main pole, and the thick shield region partially surrounds the thin shield region. The magnetic recording head is able to reduce FTI by controlling the magnetization direction of the shield layers.

In one embodiment, a perpendicular magnetic recording head having a leading side and a trailing side comprises a main pole, and a first shield region enclosing all sides of the main pole. The first shield region has a magnetization direction oriented towards the right when the leading side is disposed on the bottom of the media facing surface and the trailing side is disposed on the top of the media facing surface. A second shield region is coupled to the first shield region.

In another embodiment, a magnetic recording device comprises one or more magnetic disks, an actuator, an actuator arm coupled to the actuator, and a perpendicular magnetic recording head having a leading side and a trailing side coupled to the actuator arm. The perpendicular magnetic recording head comprises a main pole and a first shield region enclosing all sides of the main pole. The first shield region having a magnetization direction oriented towards the right when the leading side is disposed on the bottom of the media facing surface and the trailing side is disposed on the top of the media facing surface. A second shield region is coupled to the first shield region.

BRIEF DESCRIPTION OF THE DRAWINGS

So that the manner in which the above recited features discussed herein can be understood in detail, a more particular description of the above may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

FIGS. 3A-3C illustrate a perpendicular magnetic recording head, according to one embodiment.

FIGS. 7A-7B are schematic diagrams illustrating the varying magnetization directions in the shield regions.

FIG. 8A-8B illustrate a perpendicular magnetic recording head, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
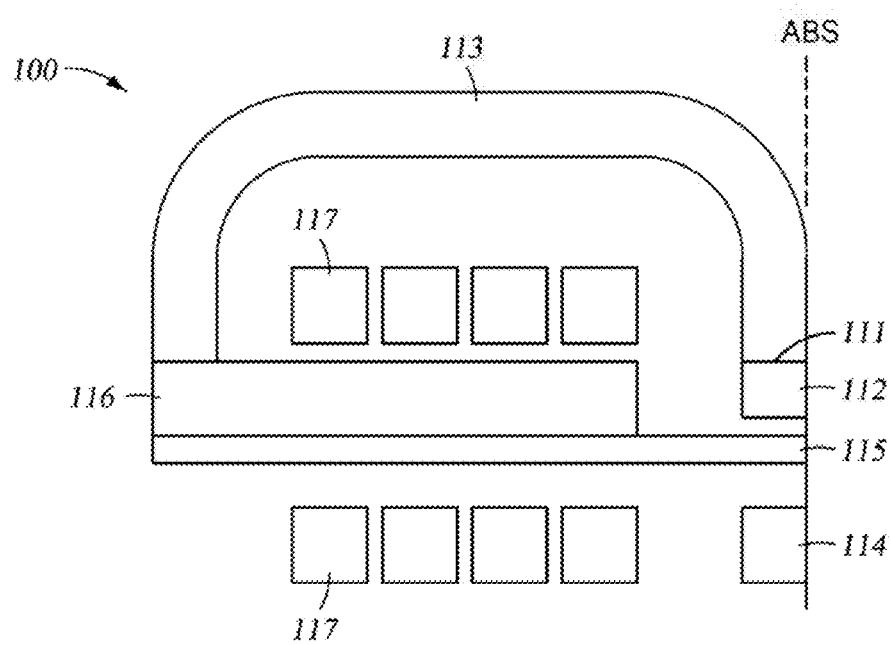
FIGS. 1A-1B illustrate a magnetic recording head, according to prior art.
Figure 1B:
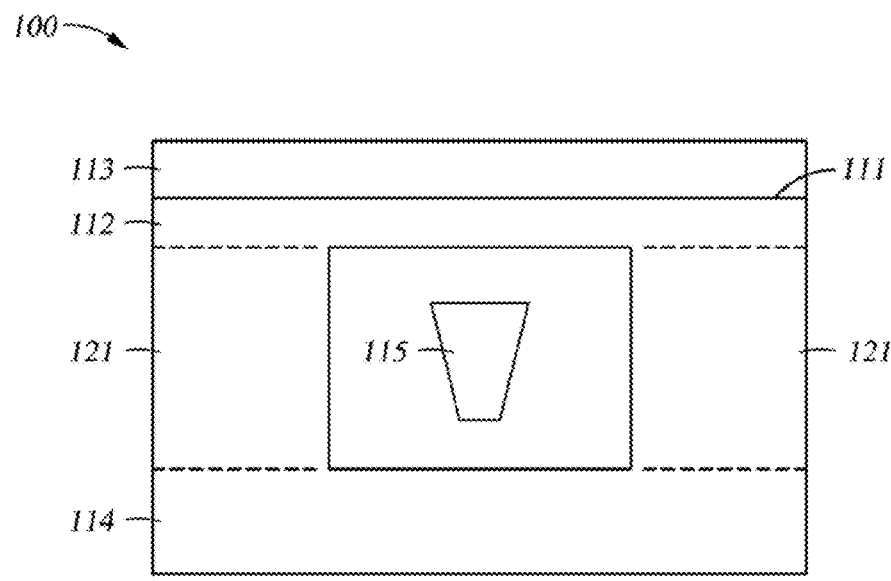

In the following, reference is made to embodiments. However, it should be understood that the disclosure is not limited to specific described embodiments. Instead, any combination of the following features and elements, whether related to different embodiments or not, is contemplated to implement and practice the disclosure. Furthermore, although the embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments disclosed herein generally relate to a perpendicular magnetic recording head for recording magnetic information and a magnetic recording device employing the magnetic head. The magnetic recording head comprises at least one thin shield region having a high coercive force and a magnetization direction oriented towards the right when viewed from the MFS with the leading side on bottom and the trailing side on top, and at least one thick shield region having a low coercive force. The thin shield region surrounds a main pole, and the thick shield region partially surrounds the thin shield region. The magnetic recording head is able to reduce FTI by controlling the magnetization direction of the shield layers.

FIG. 3A illustrates a perpendicular magnetic recording head 300 when viewed from the media facing surface (MFS), according to one embodiment. FIG. 3B shows a cross-sectional illustration of the magnetic recording head 300 through the line labeled 3B in FIG. 3A. FIG. 3C shows a cross-sectional illustration of the magnetic recording head 300 through the line labeled 3C in FIG. 3A. The MFS may be an air bearing surface (ABS). The basic components of the magnetic recording head 300 such as the coil and the auxiliary pole, etc., have been omitted for clarity. The magnetic recording head 300 comprises a main pole 302 surrounded by a non-magnetic structure 306. The non-magnetic structure 306 is disposed between the main pole 302 and a first shield region 304, and the magnetic field gradient from the main pole 302 is increased. A second shield region 308 is disposed in contact with the first shield region 304. The second shield region 308 may partially surround the first shield region 304, and in one embodiment, the second shield region 308 surrounds three sides of the first shield region 304. The first shield region 304 may be on the leading side (LS) of the magnetic recording head 300 and the second shield region 308 may be on the trailing side (TS). The first shield region 304 has a film thickness J and the second shield region 308 has a film thickness K, as shown in FIGS. 3B and 3C. The film thickness of the first shield region 304 is set to be less than that of the second shield region 308. The film thickness is measured from the MFS into the paper in FIG. 3A.

When viewing the magnetic recording head 300 from the MFS with the leading side on the bottom and the trailing side on the top, as shown in FIG. 3A, both the applied magnetization, as shown by arrow 320, and the magnetization direction 324 of the first shield region 304 are oriented to the right. FIG. 3A shows the magnetization direction 324 oriented to the right to be towards the outer diameter (OD) of the recording media, however, the magnetization direction 324 oriented to the right may be towards the inner diameter (ID) of the recording media as long as the leading side is on bottom and the trailing side is on top when viewed from the MFS. A coercive force of the first shield 304 is greater than a coercive force of the second shield 308, due to the difference in thickness of the shield regions 304, 308. Thus, the difference in coercive force between the thin shield region 304 and the thick shield region 308 is easily controllable by adjusting the thickness of the regions 304, 308. Further, the thin shield region 304 may have thin layer thickness to increase the coercive force while the thick shield region 308 may have thick layer thickness to decrease the coercive force. Since thin shield region 304 is disposed on the leading side of the magnetic recording head 300, the region 304 having higher coercive force is disposed on the leading side. Likewise, the thick shield region 308 is disposed on the trailing side, resulting in the lower coercive force region 308 being disposed on the trailing side of the magnetic record head 300.

The first shield region 304 and the second shield region 308 may comprise magnetically permeable materials, such as Ni, Co and Fe alloys, and in one embodiment, comprises NiFe alloy. Using magnetically permeable materials to comprise the shield regions 304, 308 may further increase the strength of the coercive force. The main pole 302 may be a magnetic material such as a CoFe alloy, and the non-magnetic structure 306 may comprise Ta, TaO, Ru, Rh, NiCr, SiC, TiO, $SiO_2$ or $Al_2O_3$. The first and second shield regions 304, 308 may be formed using a plating method. In one embodiment, the film thickness J of the first shield region 304 is set at about 200 nm while the film thickness K of the second shield region 308 is set at about 300 nm or more. The first shield region 304 in the vicinity of the main pole 302 is a location where FTI may be produced.

The first shield region 304 has a width D of about 1 μm on the trailing side above the main pole 302, and a width E of about 30 μm on the leading side below the main pole 302. The first shield region 304 has a height F of about 1 μm in the area surrounding the main pole 302 (downtrack direction), and a height measured into the page of about 1 μm on the LS side. Furthermore, the range of the shield region 304 is approximately equal to the width of the region 308, and has a rectangular shape overall (width 30 μm, height 0.5-1 μm) which absorbs the unevenness in the region 308 above and below. The thin shield region 304 may be formed using a divided process. The dotted line in FIG. 3A illustrates where the bonding face between the pieces of the thin shield region 304 would lie.

In one embodiment, the width D and the height F of the first shield region 304 are essentially equal. This is to account for the demagnetizing field produced at the boundary between the thick shield region 308 and thin shield region 304. If the width D is less than the height F, the demagnetizing field is intensified, and as such, the magnetization in the region of high coercive force is likely to be disrupted, which may lead to the formation of an unintended magnetic domain.

In order to effectively achieve the desired function of the embodiments presented herein, it may seem preferable from the point of view of reducing the demagnetizing field to make the width D of the first shield region 304 greater than the height F. However, the first shield region 304 having these dimensions would mean a larger region of high coercive force. Particularly, there would be a problem in that there is a reduction in the intrinsic function of drawing magnetic flux from the flare forming part of the main pole 302 (having the function of constricting the magnetic flux) into the shield. As a result, the recording performance would deteriorate or the FTI-restricting effect would deteriorate due to the direct effect from the flare. Thus, the width D of the first shield region 304 in the vicinity of the main pole 302 and the height F are therefore essentially equal when the present embodiment is implemented.

The film thicknesses of the shield regions 304, 308 are chosen by appropriately selecting the magnetic properties of a soft magnetic film and a NiFe alloy film (saturation magnetic flux density 1.3 T) used to comprise the first and second shield regions 304, 308. The aim of the different film thicknesses of the shield regions 304, 308 lies in imparting a difference in coercive force of at least 8 KAT (100 Oe) between the two shield regions 304, 308. The coercive force varies according to the thickness of the soft magnetic film: the thinner the film, the greater the coercive force.

Table 1 shows the film-forming conditions for utilizing a plating method when forming the first and second shield regions 304, 308. Table 2 shows the results of measuring the relationship between the soft magnetic film thickness and coercive force (Hce: easy magnetization direction, Hch: hard magnetization direction). The test results are based on the plating method. In Table 2, magnetic characteristics other than coercive force are also included (Hk: anisotropic magnetic field, λ: magnetostriction, Bs: saturation magnetic flux density). The variations in the magnetic characteristics with respect to film thickness are shown in the graphs in FIGS. 4A-4D.

TABLE 1

Film-Forming Conditions for Utilizing the Plating Method

| | |
|---|---|
| pH | 1.90 |
| Ni2+ [g/L] | 11.83 |
| Fe2+ [g/L] | 6.19 |
| temperature [° C.] | 30 |
| Current type | DC |
| Current [mA] | 550 |

TABLE 2

Relationship Between Soft Magnetic Film Thickness and Magnetic Characteristics

| Target Thickness [nm] | 100 | 200 | 300 | 500 | 800 |
|---|---|---|---|---|---|
| Ni [wt %] | 42.48 | 43.45 | 44.87 | 44.74 | 44.99 |
| Fe [wt %] | 57.52 | 56.55 | 55.13 | 55.26 | 55.01 |
| Actual Thickness [nm] | 98.48 | 202.34 | 290.48 | 500.30 | 794.39 |
| Hce [Oe] | 14.01 | 8.44 | 3.66 | 2.06 | 1.77 |
| Hch [Oe] | 7.65 | 3.99 | 0.62 | 0.22 | 0.54 |
| Hk [Oe] | 1.70 | 5.02 | 8.38 | 9.64 | 10.32 |
| λ | 5.87 | 5.22 | 5.09 | 3.83 | 5.14 |
| Bs [T] | 1.67 | 1.67 | 1.69 | 1.65 | 1.69 |

Table 2 clearly illustrates the relationship between the thickness of the soft magnetic film and the coercive force. As the thickness (nm) is increased, the coercive force (Oe) consistently decreases. Thus, the thin shield region 304 has a higher coercive force than the thick shield region 308.

Figure 4A:
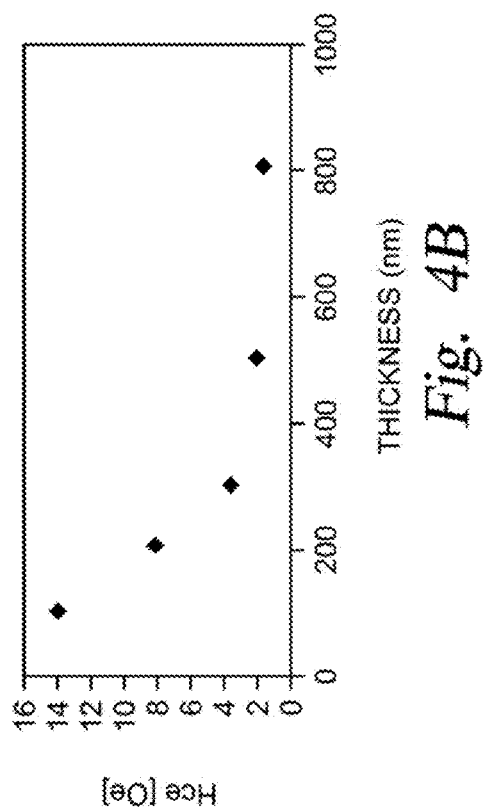
FIGS. 4A-4D are graphs showing variations in the magnetic characteristics with respect to film thickness of the shield regions.
Figure 4B:
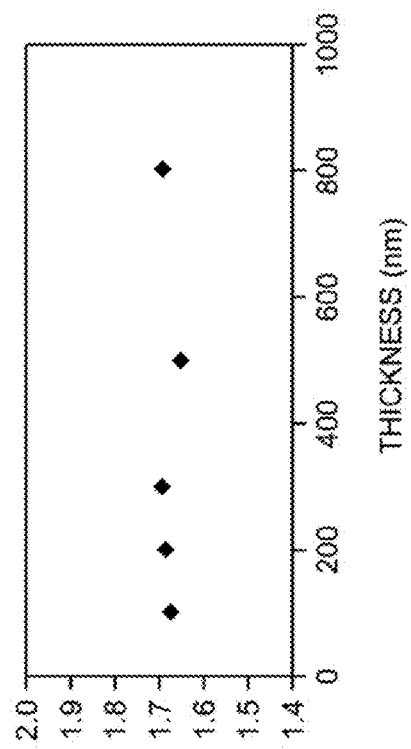
Figure 4C:
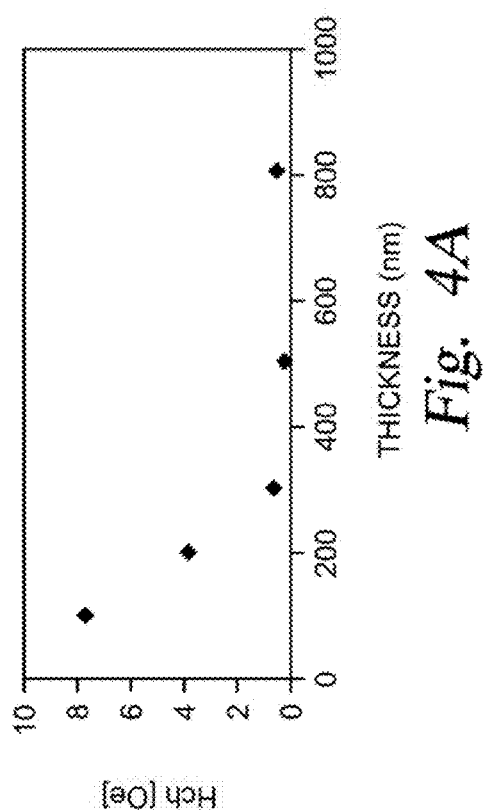
Figure 4D:
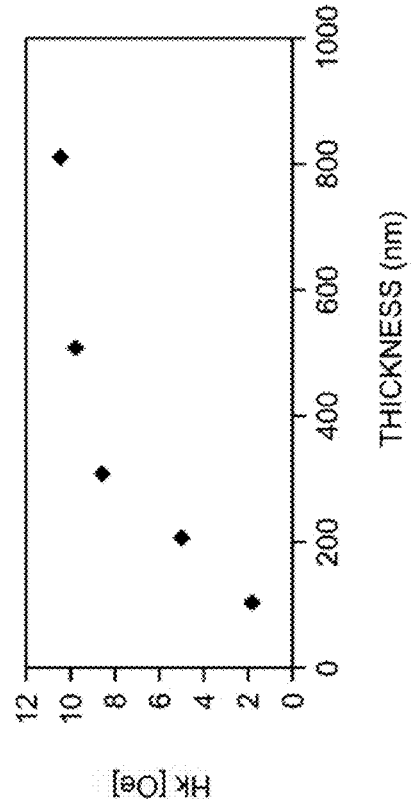

FIG. 4A is a graph showing thickness (nm) versus hard magnetization direction (Oe). FIG. 4B is a graph showing thickness (nm) versus easy magnetization direction (Oe). FIG. 4C is a graph showing thickness (nm) versus anisotropic magnetic field (Oe). FIG. 4D is a graph showing thickness (nm) versus saturation magnetic flux density (T). As is clear from the results in FIGS. 4A-4D, when the film thickness is reduced, there is a clear increase in the coercive force (Hce, Hch). In particular, a marked increase is apparent at the 300 nm boundary. Thus, it is possible to provide a clear difference in coercive force by using a film thickness of 300 nm or more for the region of small coercive force (second shield region 308) and by using a film thickness of about 200 nm or less for the region of high coercive force (first shield region 304).

The difference in coercive force required for the embodiments presented herein can therefore be achieved with a difference in film thickness of about 100 nm. However, it is necessary to find the optimum range suitable when other materials are used due to variations in the coercive force in other soft magnetic films and a slight difference in dependency on the film thickness. Other means for partially increasing the coercive force include varying the material composition and selective ion implantation, among others.

The target range of the coercive force difference of at least 8 KAT (100 Oe) between the first shield 304 and the second shield 308 differs from the values in the test results shown in Table 2. The results relate to a test involving a complete film (large surface area), and the target value in this case is the value after patterning. In the case of a small pattern, the demagnetizing field has a marked effect, so the apparent coercive force appears to be considerably larger. However, a person skilled in the art will readily understand that the coercive force in this case is also proportional to the coercive force in a complete film. That is to say, coercive force of a complete film, which is about 3.66 Oe, is proportional to the coercive force of a film patterned by processing, which is about 100

Oe. If the coercive force is high, coercive force of a complete film, which is about 8.44 Oe, is proportional to the coercive force of a film patterned by processing, which is about 230 Oe. As a result, a difference in coercive force of about 100 Oe or greater is achieved between the first shield region 304 and the second shield region 308.

A uniform magnetic field of 48 KAT (600 Oe) is applied in the right-hand direction (off-track direction, shown by arrow 320) to the MFS of magnetic recording head 300, and the shield as a whole is magnetized. As the applied magnetic field 320 is gradually reduced, a reverse magnetic domain produced by the demagnetizing field is formed from the left and right ends of the thick region 308. The reverse magnetic domain has a magnetization direction, as shown by arrow 322, that is opposite to that of the applied magnetic field 320. By gradually reducing and controlling the applied magnetic field intensity, the reverse magnetic domain can extend as far as the main pole region along the shield boundary of the thin shield region 304 and the thick shield region 308. The applied magnetic field may be reduced from max field to zero or no field in the order of milliseconds. After the applied magnetic field has been fully removed, the reverse magnetic domain is selectively provided to the thick shield region 308 on the trailing side. When the magnetic recording head 300 is viewed from the MFS with the trailing side on top and the leading side on bottom, a magnetized field 324 applied in the thin shield region 304 has the same orientation directed towards the right as the originally applied magnetic field is applied in the thin shield region 304.

A difference in coercive force is intentionally produced in the shield regions 304, 308 and an external magnetic field 320 is applied. In this process, the first shield region 304 needs to be arranged in such a way that the magnetization direction 324 is in the same direction as the applied external magnetic field 320. It may then be necessary to adjust the applied magnetic field intensity. After the adjustment of the magnetic field intensity, the external magnetic field is gradually removed, and as such, a reverse magnetic domain, in which the magnetization direction 322 is opposite to that of the applied magnetic field 320, is produced in the location of low coercive force, which is the thick shield region 308. FTI is not caused in the thick shield region 308. The reverse magnetic domain (thick shield region 308) is magnetostatically coupled to a region (thin shield region 304) having an inherent magnetization direction 324, and therefore the position and magnitude thereof are both stable after the external magnetic field has been removed. As a result, it is possible to achieve a state in which the magnetization direction 324 of the thin shield region 304 where FTI is caused is maintained in the external magnetic field direction 320. Thus, it is possible to achieve an effect of restricting FTI with a high degree of reliability.

Figure 5A:
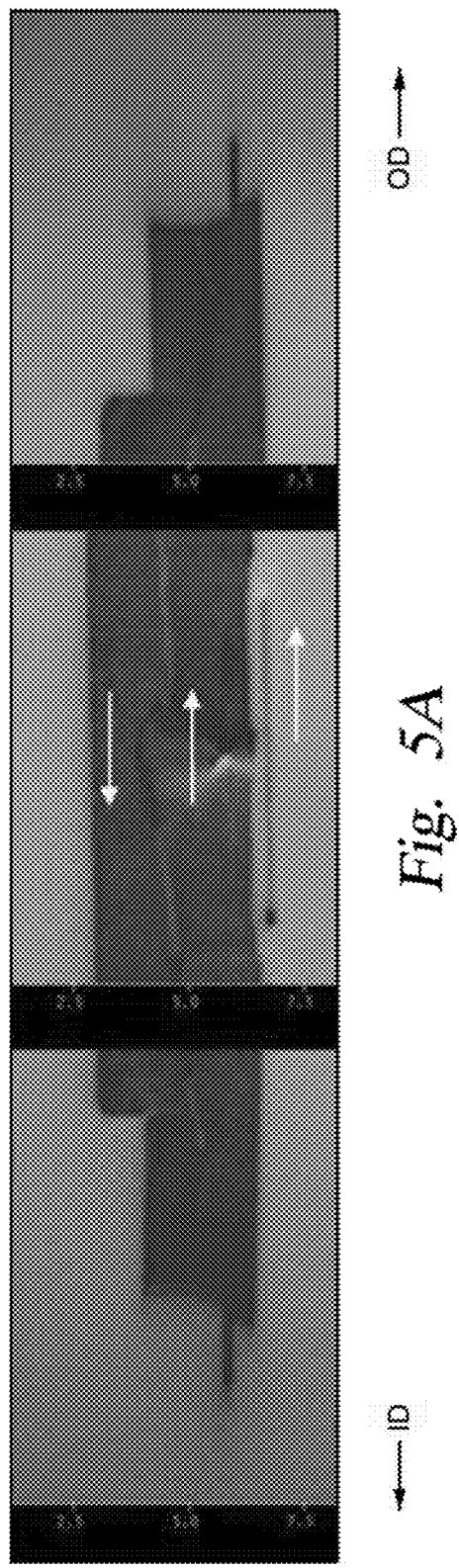
FIGS. 5A-5B are MFM images showing the magnetization states of the shield regions.
Figure 5B:
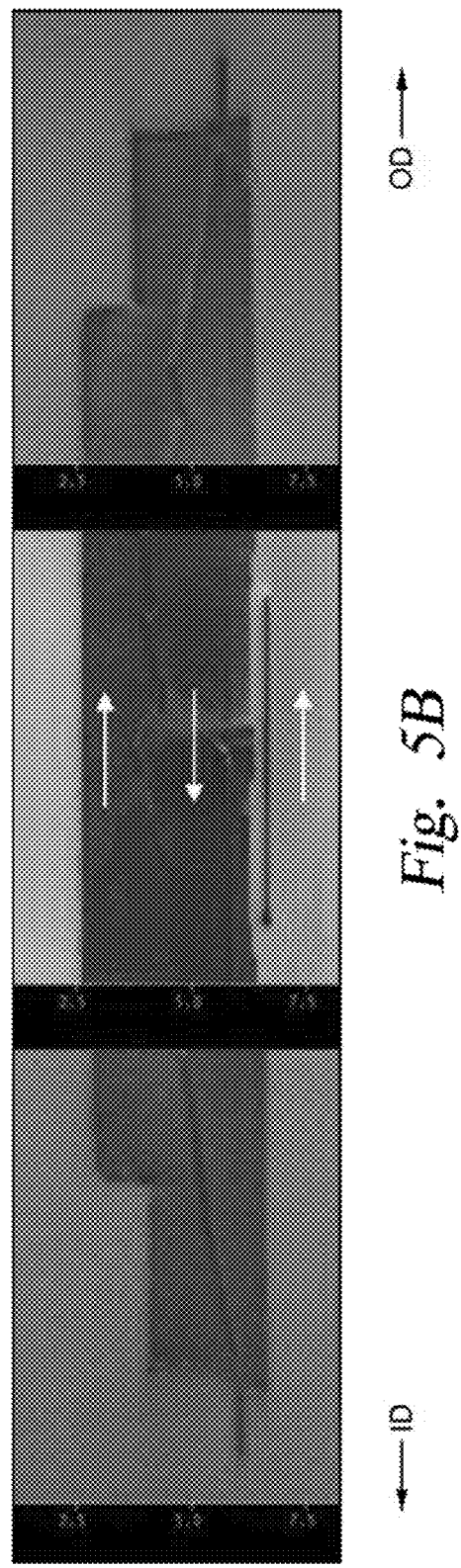

The magnetized state of the shield can be confirmed by a magnetic force microscope (MFM). By suitably setting the magnitude of the external magnetic field, it is also possible to set the intended magnetization state if the coercive force in the shield location is unknown. FIGS. 5A-5B are MFM images showing the magnetization states of the shield regions of FIG. 3A in which the magnetization directions have been intentionally set. FIG. 5A shows the magnetized state of the shield viewed from the MFS with the trailing side on top and the leading side on bottom when the external magnetic field is applied towards the right and reduced, allowing for the reverse magnetic domain to result in the thick shield region 308 and for a magnetization direction anti-parallel to the thick shield region 308 to be maintained in the thin shield region 304. The magnetization direction 324 of the thin shield region 304 is oriented towards the right. The main pole is apparent in the center and the magnetization direction is identified from the contrast of the shield part. That is to say, in this example, the end part of the magnetic material (not part of the magnetic head structure) disposed at the lower part of the shield appears bright as a result of the application of an applied magnetic field toward the right. Furthermore, it can also be seen that the end part where the shield has been thinned by applying the magnetic field also appears bright, and it will be understood that the vicinity of the main pole is magnetized with the same orientation as the applied magnetic field. A magnetic wall is present at the region where the shield has been thickened, and therefore it will be understood that the magnetization direction in that region is opposite to the orientation of the applied magnetic field. In one embodiment, the magnetization directions of the thin shield 304 and the thick shield 308 may be intentionally set so that both magnetization directions are oriented towards the right. In this embodiment, the reverse magnetic domain would not arise in the thick shield region 308, and the magnetization directions of the thin shield region 304 and the thick shield region 308 would be parallel.

FIG. 5B shows an example when the magnetization direction of the thin shield region 304 is intentionally set to be oriented towards the left when viewed from the MFS with the trailing side on top and the leading side on bottom. FIG. 5B also shows the thickness of the shield regions 304, 308 being essentially equal. This situation is identified from the fact that there is little variation in brightness in the vicinity of the main pole. In this case, the point of focus is the fact that the reverse magnetic domain is disposed on the main pole side, and as a result the shield magnetization direction in the vicinity of the main pole is toward the left, being anti-parallel with the applied magnetic field rather than parallel. However, the probability of the magnetization direction in the same location as the applied magnetic field direction (the state shown in FIG. 5A) can be made essentially 100% by increasing the coercive force of the shield 304 on the LS side and adjusting the applied magnetic field intensity.

Figure 6A:
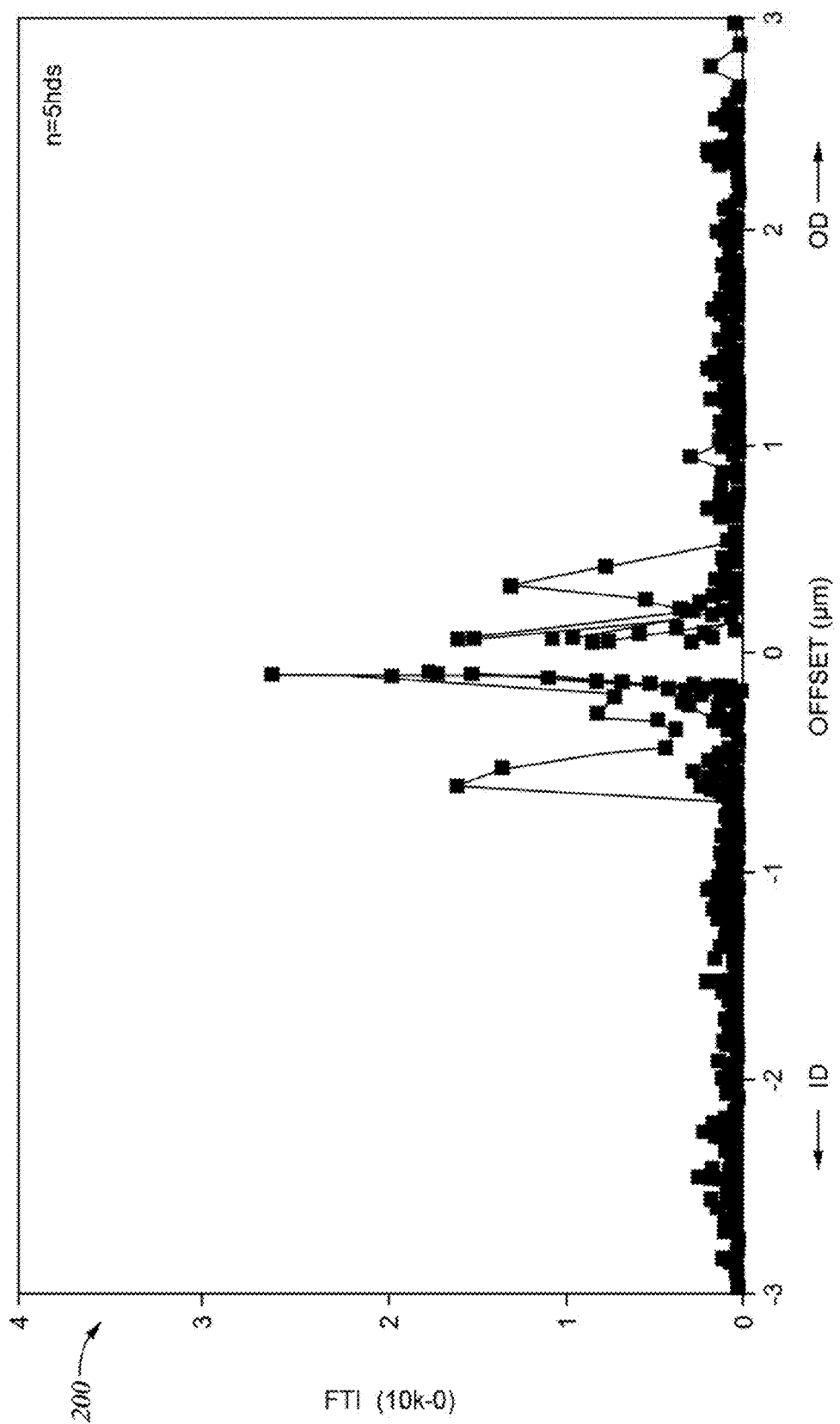
FIGS. 6A-6B are graphs showing the results of measuring the FTI when the direction of shield magnetization varies.
Figure 6B:
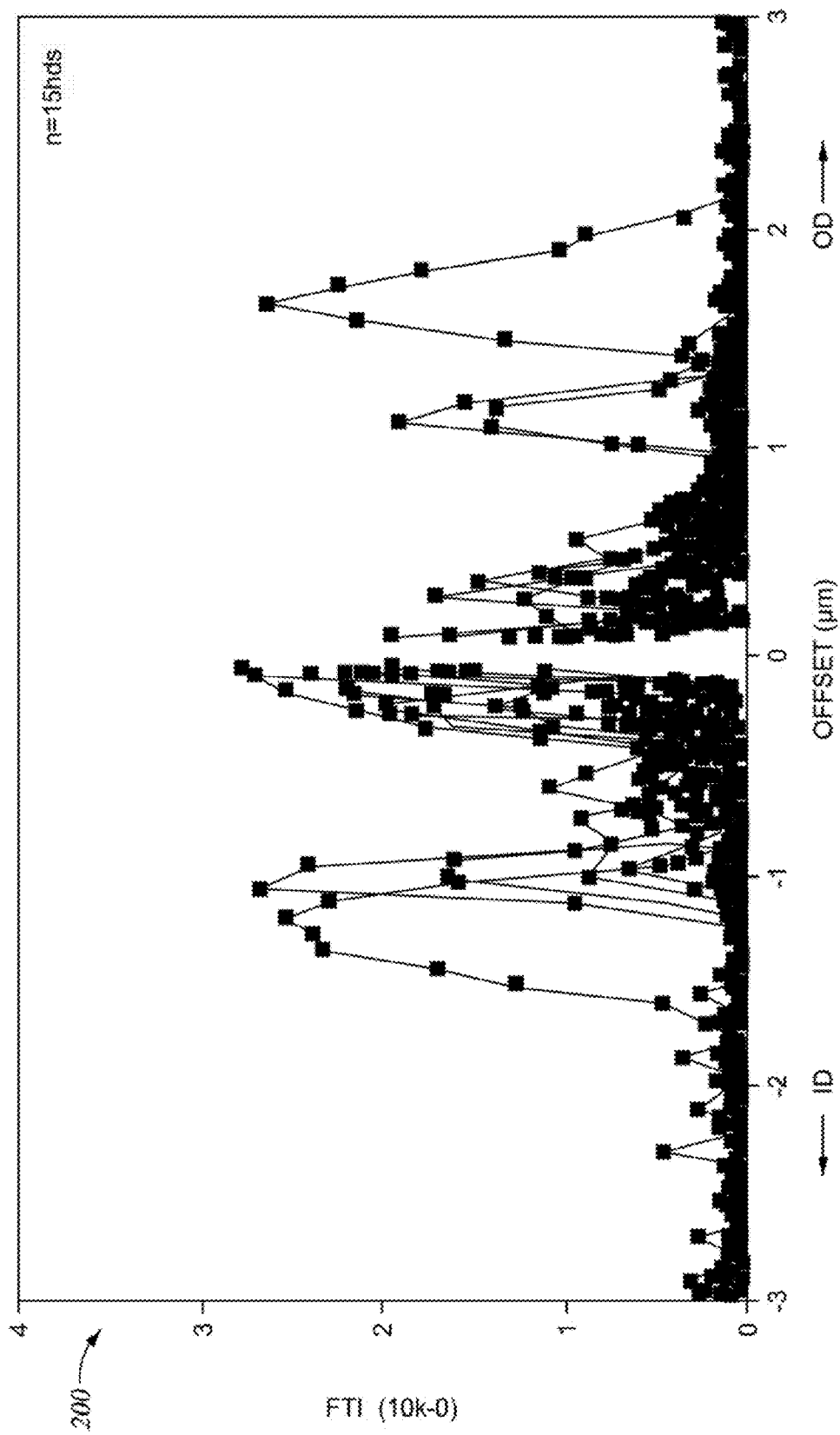

It was found that there is a large difference in FTI characteristics in the shield regions having the two types of magnetization states shown in FIGS. 5A-5B. FIG. 6A shows the results of measuring the FTI when the direction of shield magnetization in the vicinity of the main pole is oriented toward the right (FIG. 5A), while FIG. 6B shows results when the orientation is toward the left (FIG. 5B). In FIG. 6A, the applied magnetic field and the magnetization direction of the thin shield region are parallel to one another and directed towards the right when the magnetic recording head is viewed from the MFS with the trailing side on top and the leading side on bottom, while the magnetization direction of the thick shield region is anti-parallel to the thin shield region and the applied magnetic field. In FIG. 6B, the applied magnetic field and the magnetization direction of the thin shield region are anti-parallel to one another, with the magnetization direction of thin shield region being directed towards the left, while the magnetization direction of the thick shield region is parallel to the applied magnetic field. In both FIG. 6A and FIG. 6B, the thick shield region may have a magnetization direction parallel to the magnetization direction of the thin shield region. In both cases the horizontal axis shows the off-track direction position, with ID representing the inner diameter of a recording medium and OD representing the outer diameter of the recording medium, while the vertical axis shows the amount of deterioration (order of magnitude) of the error rate (SER) at the amount of FTI disturbance. When the numerical value is high, the initial SER value is impaired causing erroneous operation of the hard disk device.

Figure 2:
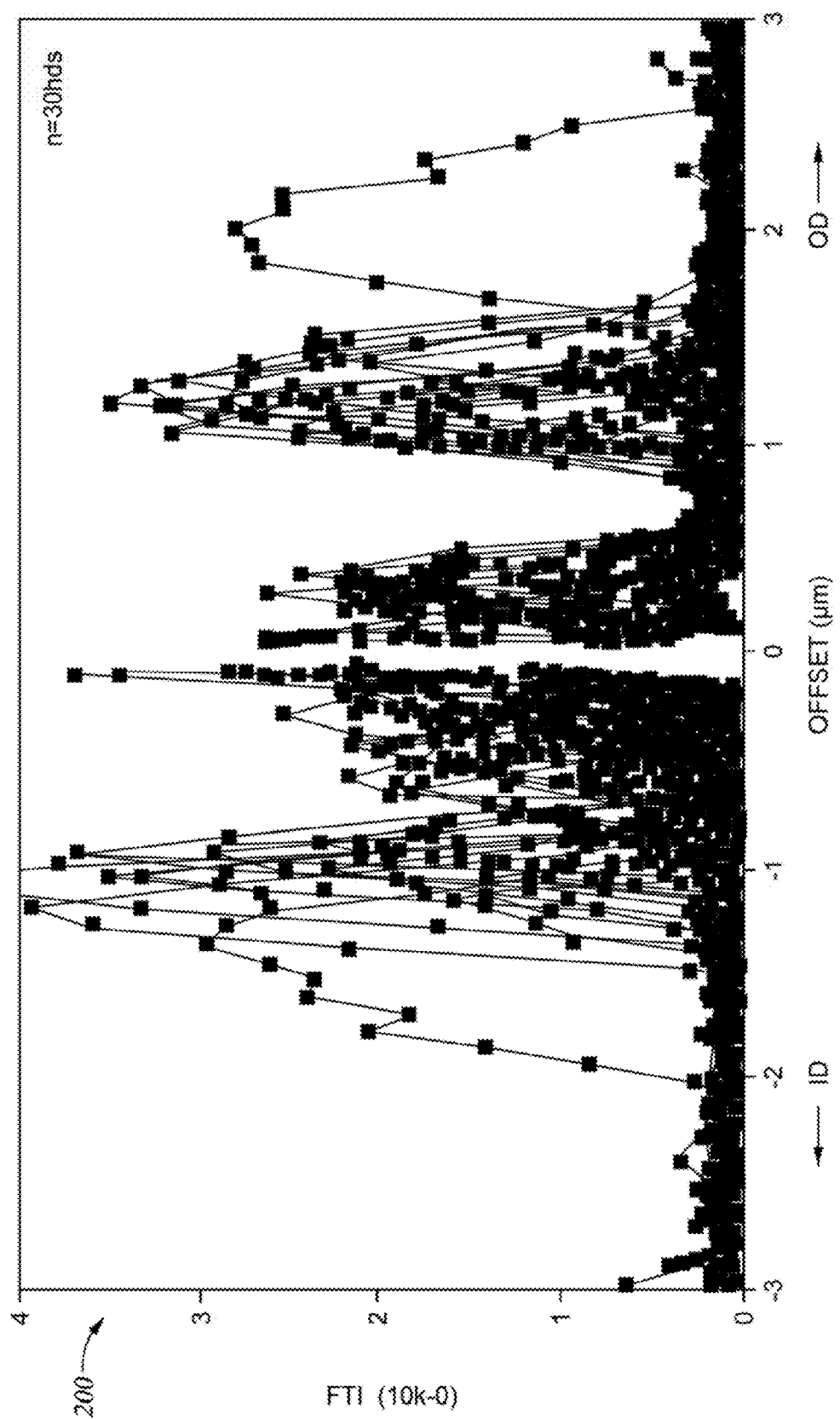
FIG. 2 is a graph showing an example of FTI in the magnetic recording head of FIG. 1.

A comparison of the two states shows that when the shield magnetization direction in the vicinity of the main pole is oriented to the left (FIG. 6B), there is a marked deterioration in SER at a position which is remote (1-2 μm) from the center track position (0 μm) in both the ID and OD directions. FIG. 6B shows similar results to graph 200 of FIG. 2. On the other hand, when the shield magnetization direction in the vicinity of the main pole is oriented to the right (FIG. 6A), deterioration in SER is not observed, with the exception of one head. These results suggest that it is necessary to forcibly control the shield magnetization direction when an FTI-resistant head is produced and to orient the shield magnetization direction in the vicinity of the main pole to the right.

The reason for the improvement or deterioration in the FTI produced by the shield magnetization direction will be described below. FIGS. 7A-7B show a schematic diagram showing the results of analyses using the Landau-Lifshitz-Gilbert equation (LLG), and illustrate the varying magnetization directions in the shield regions. The dynamic behavior of magnetization is explained by force acting in the right-screw direction with respect to the applied magnetic field: gyromagnetic force ($-\gamma J \times H$), and force attempting to orient magnetization in the direction of the applied magnetic field (force attempting to cause rotation in a direction which reduces energy): Zeeman force ($-\alpha\gamma/J_s \times (J \times H)$).

The description will focus first on a case in which the magnetization in the vicinity of the main pole is oriented to the right in the magnetic recording head 700 when viewed from the MFS with the trailing side on top and the leading side on bottom, as shown in FIGS. 5A, 6A and 7A. A coil is disposed at a position intersecting the main pole (not shown) and a current of +Iw is assumed to flow to the coil. Magnetic flux φ is induced by the current and flows from the main pole to the shield, as shown by arrow 730. The magnetic flux flows along the magnetic structure 700, and as a result has an oblique component. The perpendicular component of the magnetic field produced by means of the magnetic flux is denoted Hapy while the in-plane component of the magnetic field is denoted Hapz. The magnetization 732 near the main pole (MP) is oriented to the right with respect to the MFS, and rotational force is demonstrated in the positive y-axis direction as a result of Hapz. At the same time, rotational force in the negative y-axis direction is received as a result of Hapy (having a negative y-axis-direction component). The force directions are anti-parallel, and as a result, the rotational force of magnetization in the y-axis direction is restricted. Rotation of magnetization in the y-axis direction means that magnetic charge is produced at the shield surface, and it is possible to restrict the generation of magnetic charge as a result of magnetization rotation being restricted. The rotational direction of the magnetization produced by gyromagnetic force is anti-parallel with the rotation direction produced by Zeeman force.

The description will focus next on a case in which the magnetization in the vicinity of the main pole is oriented to the left in the magnetic recording head 750, as shown in FIGS. 5B, 6B and 7B. If the current polarity is the same (+Iw) as FIG. 7A, the orientation of the Zeeman force is not dependent on the magnetization direction 734 near the main pole, and the magnetization 734 is likewise subjected to rotational force in the negative y-axis direction as a result of Hapy. However, the rotational force produced by Hapz exhibits rotational force in the negative y-axis direction as well because the magnetic charge is oriented to the left. In this case, the rotational direction of the magnetization produced by gyromagnetic force coincides with the rotation direction produced by Zeeman force. As a result, the angle of rotation of magnetization increases and an intense magnetic charge is produced at the shield surface. This magnetic charge produces a leakage magnetic field which causes FTI.

The behavior of the magnetization is in entirely the opposite direction when the polarity of the coil current Iw is reversed. The intensity of the magnetic charge produced at the surface of the shield is entirely determined by the difference in magnetization direction of the shield regions in the vicinity of the main pole. Table 3 shows the results of variations in the polarity of gyromagnetic force and Zeeman force, and summarizes the relationship between current polarity and differences in magnetization direction in the vicinity of the main pole (in the case of FIG. 7A when the magnetization 732 is oriented to the right and FIG. 7B when the magnetization is oriented to the left 734).

TABLE 3

Behavior of Magnetization of a Magnetic Recording Head Depending on the Orientation of the Main Pole

| | | Near Main Pole | |
| --- | --- | --- | --- |
| | Iw Spin torque | Gyromagnetic force ($-\gamma J \times H$) | Zeeman force ($-\alpha\gamma/J_s \times (J \times H)$) |
| FIG. 7A (Right direction) | +Iw | + | − |
| | −Iw | − | + |
| FIG. 7B (Left direction) | +Iw | − | − |
| | −Iw | + | + |

As is shown in Table 3, when the magnetization 732 near the main pole is oriented to the right, it is possible to suppress rotation in the floating direction (±y-axis) of magnetization under all current polarities. It can be understood from these results that it is possible to suppress magnetic charge at the shield surface, and as a result it is possible to reduce the leakage magnetic field from the shield. Reducing the leakage magnetic field from the shield reduces FTI.

It is possible to set the rate of FTI disturbance to less than 1% by adopting the configuration of FIGS. 3A-3C and the means for orienting the shield magnetization in the required direction. It has been confirmed that a 1% disturbance is attributable to fluctuations in shield thickness (due to tolerances in the wafer process and MFS processing), and it can be said that FTI could be essentially eliminated if it were possible to improve the shield thickness tolerance by improving production tolerance and inspection after MFS processing.

The present embodiment involves selectively controlling and managing the shield thickness and regulating the applied magnetic field, so this has no effect on head production costs but does have the advantage of restricting FTI to a level close to 100%.

The magnetization direction of the regions in the magnetic recording head 300 may be set in a number of ways. One way to intentionally set the direction of the magnetizations of the magnetic recording head 300 is to set an initialization magnetic field at a sufficient value to saturate the thin shield region 304 and the thick shield region 308. Saturating the thin shield region 304 and the thick shield region 308 with the initialization magnetic field arranges the magnetization of the shield regions 304, 308 in the magnetic field impression direction. The initialization magnetic field then weakens the impression magnetic field gradually. The gradual weakening of the impression magnetic field may result in the thin shield region 304 having a higher coercive force. A reverse magnetic domain occurs in the ends of the thick shield region 308 due to a demagnetization field. As the impression magnetic field reduces, the reverse magnetic domain expands throughout the thick shield region 308.

Expansion of the reverse magnetic domain is influenced by the value of the coercive force in the shield regions 304, 308. The reverse magnetic domain preferably occurs in the thick shield region 308 where the coercive force is smaller. The reverse magnetic domain allows the magnetization area of the thin shield region 304 where the coercive force is larger, to remain in the direction of the impression magnetic field. As a result, the thin shield region 304 is able to be set in the direction of the impression magnetic field, and a reverse magnetic domain occurs in the thick shield region 308. Thus, the magnetization direction of thin shield region 304 is able to be set arbitrarily by setting up the impression magnetic field in a predetermined direction.

FIG. 8A illustrates a perpendicular magnetic recording head 800 when viewed from the MFS, according to another embodiment. FIG. 8B shows a cross-sectional of the magnetic recording head 800 through the line labeled 8B in FIG. 8A. FIGS. 8A-8B describe a configuration of a magnetic recording head 800 which is suitable for achieving scalability of the shield shape. In this embodiment, the magnetic recording head 800 comprises a main pole 802, a non-magnetic film 806, a first thin shield region 812 and a first thick shield region 810. Second shield regions 814, 816 having a different thickness than the first shield regions 810, 812 are disposed in the inflow side (leading side) of the magnetic recording head 800. Specifically, a second thick shield region 814 is disposed adjacent to and in contact with the first thin shield region 812. A second thin shield region 816 is disposed outside and in contact with the second thick shield region 814 on the leading side.

The first thin shield region 812 has a higher coercive force than the first thick shield region 810 and the second thick shield region 814. The second thin shield region 816 has a higher coercive force than the first thick shield region 810 and the second thick shield region 814. An applied magnetic field having a magnetization direction shown by arrow 820 and the magnetization direction 824 of the first thin shield region 812 are oriented toward the right when the magnetic recording head 800 is viewed from the MFS with the leading side on the bottom and the trailing side on the top. FIG. 8A shows the magnetization direction 824 oriented to the right to be towards the outer diameter of the recording media, however, the magnetization direction 824 oriented to the right may be towards the inner diameter of the recording media as long as the leading side is on bottom and the trailing side is on top when viewed from the MFS. The magnetization direction of the regions in the magnetic head 800 may be intentionally set using the same method used to set the magnetization directions in the magnetic head 300 described above. The first thick shield region 810 has a reverse magnetic domain, with a magnetization direction 822 anti-parallel to the magnetization direction 824 of the first thin shield region 812 and the applied magnetic field 820. In one embodiment, the first thick shield region 810 may have a magnetization direction parallel to the first thin shield region 812, being directed towards the right as well. The difference in coercive force between the thin shield regions 812, 816 and the thick shield regions 810, 814 is easily controllable by adjusting the thickness of the regions. The second thick shield region 814 and second thin shield region 816 both have a horizontally long shape. In one embodiment, the second thick shield region 814 and second thin shield region 816 have a width of about 30 μm and about 1 μm in the height (downtrack) direction. Since the newly added thick shield region 814 and thin shield region 816 are horizontally long, the magnetization anisotropy is exhibited in the longitudinal direction, due to the shape effect.

It will be readily understood that because of the shape effect, the magnetization direction of both second shield regions 814, 816 is oriented in the track width direction by means of an external magnetic field which is applied when the magnetization direction of the shield is controlled. The second thick shield region 814 has a reverse magnetic domain, having a magnetization direction 826 anti-parallel to the magnetization direction 824 of the first thin shield region 814 and the applied magnetic field 820. The second thick shield region 814 has a magnetization direction 826 parallel to the magnetization direction 822 of the first thick shield region 810. The second thin shield region 816 has a magnetization direction 828 anti-parallel to the magnetization directions 822, 826 of the first and second thick shield regions 810, 814, and a magnetization direction 828 parallel to the magnetization direction 824 of the first thin shield region 812 and the applied magnetic field 820. Here, the reverse magnetic domain is disposed in the thick shield regions 810, 814 after the external magnetic field has been removed, as a result of the difference in film thickness provided in the respective shield locations. That is to say, a situation is produced in which the magnetization directions are different to the left and right due to the difference in film thickness, as shown by the magnetization direction arrows 820, 822, 824, 826, 828 in the figure.

In one embodiment, the magnetization direction 826 of the first thin shield region 812 is intentionally set to the right when the magnetic recording head 800 is viewed from the MFS with the trailing side on top and the leading side on bottom. The magnetization direction 822 of the first thick shield region 810 may be parallel to the magnetization direction 824 of the first thin shield region 812. The magnetization direction 826 of the second thick shield region 814 may also have a magnetization direction parallel to that of the first thin shield region 812. The second thin shield region 816 may have a magnetization direction 828 oriented towards the left, or anti-parallel to the magnetization direction 824 of the first thin shield region 812. Demagnetizing fields interact between the regions where the magnetization directions are anti-parallel to one another, and as such, strong magnetostatic coupling is demonstrated. As a result, the magnetization in the second shield regions 814, 816 of the embodiment of FIG. 8A is strongly controlled in the track width direction, and there is an effect of preventing disturbance of the magnetization directions 826, 828 in the second shield regions 814, 816 with respect to the floating magnetic field. This effect is also demonstrated in the first thin shield region 812, which is likewise magnetostatically coupled. As a result, the first thin shield region 812 is able to achieve an effect of strongly maintaining magnetization 824 to the right in the vicinity of the main pole, or a magnetization direction 824 in the same direction as the applied magnetic field 820. By implementing a structure like that of magnetic recording head 800, it is possible to maintain the shield magnetization states at the required level, even under an environment in which the floating magnetic field is applied at around 200 Oe. Thus, it is possible to achieve an effect of restricting FTI with a high degree of reliability.

The magnetic recording head 800 having varying film thicknesses in the shield structure is able to increase the number of layers of shield regions within the structure, and by increasing the number of layers of shield regions, it is possible to increase the length of the entire shield toward the recording medium. By utilizing this advantage, it is possible to prevent a leakage magnetic field from the coil disposed below the main pole. That is to say, when the end of the shield including the coil is simply extended downward on the leading side towards a recording medium, the shape effect is reduced, and the magnetization direction in that location may be disturbed. As a result, a problem arises in terms of a loss of the FTI-restricting effect. According to the embodiment of FIGS. 8A-8B, the magnetization direction is not disturbed even if the shield end is extended, and the FTI-restricting effect can be maintained. In particular, it is possible to eliminate the problem of direct leakage of the coil magnetic field to the recording medium by providing the magnetic head structure 800 having varying film thicknesses in the shield layers. The additional shield layers may be added between the coil and the medium. This effect makes it possible to utilize a magnetic recording head 800 which has a high FTI-restricting effect for a recording medium having a low coercive force.

Figure 9:
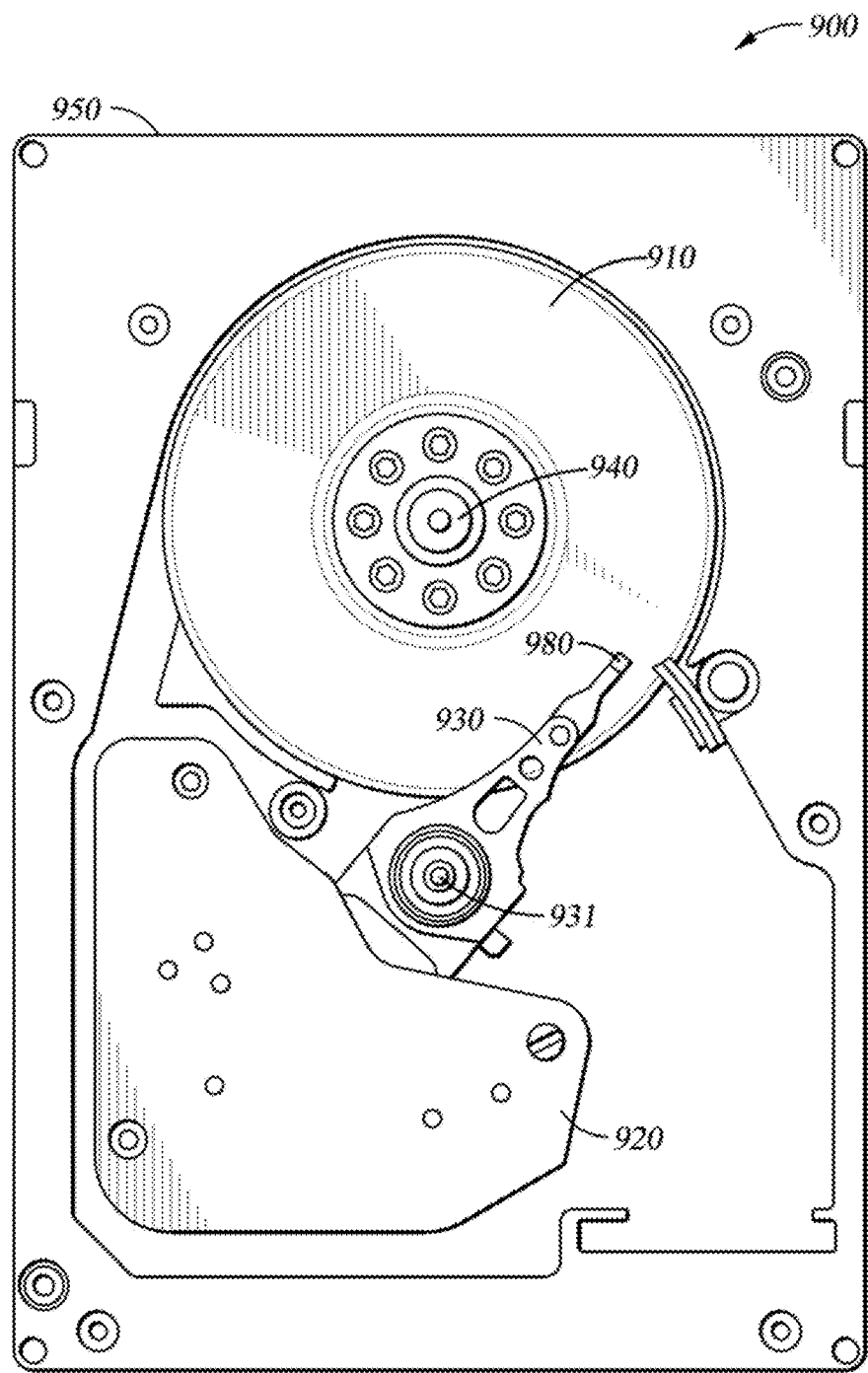
FIG. 9 illustrates an exemplary magnetic recording device.

FIG. 9 illustrates a top view of an exemplary magnetic recording device 900, such as a hard disk drive (HDD), in which magnetic recording heads 300, 800 may be utilized. As illustrated, HDD 900 may include one or more recording mediums, such as magnetic disks 910, an actuator 920, actuator arms 930 associated with each of the magnetic disks 910, and a spindle motor 940 affixed in a chassis 950. The one or more magnetic disks 910 may be arranged vertically as illustrated in FIG. 9. Moreover, the one or more magnetic disks 910 may be coupled with the spindle motor 940.

Magnetic disks 910 may include circular tracks of data on both the top and bottom surfaces of the disk. A magnetic head 980 mounted on a slider may be positioned on a track. As each disk spins, data may be written on and/or read from the data track. Magnetic head 980 may be coupled to an actuator arm 930 as illustrated in FIG. 9. Actuator arm 930 may be configured to swivel around actuator axis 931 to place magnetic head 980 on a particular data track. Magnetic heads 980 may be magnetic recording head 300, 800.

Overall, a magnetic recording head exhibiting a stable effect of restricting FTI by controlling the magnetization direction of the shield layers and by selectively thinning shield regions to increase the coercive force is provided. The magnetic recording head comprises at least one thin shield region having a high coercive force and a magnetization direction oriented towards the right when viewed from the MFS with the trailing side on top and the leading side on bottom, and at least one thick shield region having a low coercive force. By applying and reducing an external magnetic field, it is possible to achieve the required magnetization state in the shield, and there is no need for a special magnetic film, such as a permanent magnet. This allows for forcibly controlling the shield magnetization direction, and an FTI-resistant head is produced.

While the foregoing is directed to embodiments of the present invention, other and further embodiments of the invention may be devised without departing from the basic scope thereof, and the scope thereof is determined by the claims that follow.

What is claimed is:

1. A perpendicular magnetic recording head having a leading side and a trailing side, comprising:
    a main pole;
    a media facing surface;
    a first shield region enclosing all sides of the main pole, the first shield region having a magnetization direction oriented towards the right when the leading side is disposed on the bottom of the media facing surface and the trailing side is disposed on the top of the media facing surface; and
    a second shield region coupled to the first shield region, wherein the second shield region is thicker than the first shield region, wherein thickness is measured from the media facing surface into the head.

2. The perpendicular magnetic recording head of claim 1, wherein a coercive force of the first shield region is greater than a coercive force of the second shield region.

3. The perpendicular magnetic recording head of claim 1, wherein a magnetization direction of the first shield region is anti-parallel to a magnetization direction of the second shield region.

4. The perpendicular magnetic recording head of claim 1, wherein a magnetization direction of the first shield region is parallel to a magnetization direction of the second shield region.

5. The perpendicular magnetic recording head of claim 1, wherein the first shield region has an essentially equal width and height.

6. The perpendicular magnetic recording head of claim 5, wherein the second shield region is thicker than the first shield region by about 100 nm, wherein thickness is measured from a media facing surface into the head.

7. The perpendicular magnetic recording head of claim 6, wherein the first shield region has a thickness of about 200 nm and the second shield region has a thickness of about 300 nm or greater.

8. A perpendicular magnetic recording head having a leading side and a trailing side, comprising:
    a main pole;
    a media facing surface;
    a first shield region enclosing all sides of the main pole, the first shield region having a magnetization direction oriented towards the right when the leading side is disposed on the bottom of the media facing surface and the trailing side is disposed on the top of the media facing surface, wherein the first shield region has an essentially equal width and height;
    a second shield region coupled to the first shield region; and
    a third shield region coupled to the first shield region.

9. The perpendicular magnetic recording head of claim 8, wherein a fourth shield region is coupled the third shield region, the fourth shield region being thinner than the third shield region, and wherein the fourth shield region is disposed on the leading side.

10. The perpendicular magnetic recording head of claim 9, wherein the first shield region and the fourth shield region have a parallel magnetization direction and the second shield region and the third shield region have a parallel magnetization direction.

11. The perpendicular magnetic recording head of claim 10, wherein the first shield region and the second shield region have an anti-parallel magnetization direction and the third shield region and the fourth shield region have an anti-parallel magnetization direction.

12. The perpendicular magnetic recording head of claim 1, wherein the first shield region has a coercive force greater than the coercive force of the second shield region by at least 100 Oe.

13. A magnetic recording device, comprising:
    one or more magnetic disks;
    an actuator;
    an actuator arm coupled to the actuator; and
    a perpendicular magnetic recording head having a leading side and a trailing side coupled to the actuator arm, the perpendicular magnetic recording head comprising:
        a main pole;
        a media facing surface;

a first shield region enclosing all sides of the main pole, the first shield region having a magnetization direction oriented towards the right when the leading side is disposed on the bottom of the media facing surface and the trailing side is disposed on the top of the media facing surface; and a second shield region coupled to the first shield region and disposed on the leading side, wherein the second shield region is thicker than the first shield region, wherein thickness is measured from the media facing surface into the head.

14. The magnetic recording device of claim 13, wherein a coercive force of the first shield region is greater than a coercive force of the second shield region.

15. The magnetic recording device of claim 14, wherein a magnetization direction of the first shield region is parallel to a magnetization direction of the second shield region.

16. The magnetic recording device of claim 14, wherein the second shield region is thicker than the first shield region by about 100 nm.

17. The magnetic recording device of claim 14, wherein a magnetization direction of the first shield region is anti-parallel to a magnetization direction of the second shield region.

18. A magnetic recording device, comprising:

one or more magnetic disks;

an actuator;

an actuator arm coupled to the actuator; and a perpendicular magnetic recording head having a leading side and a trailing side coupled to the actuator arm, the perpendicular magnetic recording head comprising:

a main pole;

a media facing surface;

a first shield region enclosing all sides of the main pole, the first shield region having a magnetization direction oriented towards the right when the leading side is disposed on the bottom of the media facing surface and the trailing side is disposed on the top of the media facing surface; and a second shield region coupled to the first shield region and disposed on the leading side, wherein a coercive force of the first shield is greater than a coercive force of the second shield, and wherein the magnetization direction of the first shield region is anti-parallel to a magnetization direction of the second shield region; and.

a third shield region is coupled to the first shield region and a fourth shield region is coupled to the third shield region, the fourth shield region being thinner than the third shield region, and wherein the fourth shield region is disposed on the leading side.

19. The magnetic recording device of claim 14, wherein the first shield region is disposed on the leading side of the perpendicular magnetic recording head.

20. The magnetic recording device of claim 14, wherein the second shield region is disposed on the trailing side of the perpendicular magnetic recording head.

* * * * *